(12) United States Patent
Bedert et al.

(10) Patent No.: US 11,236,809 B2
(45) Date of Patent: *Feb. 1, 2022

(54) DRIVELINE FOR A VEHICLE INCLUDING AN ELECTRIC DRIVE MOTOR AND A POWERSHIFT TRANSMISSION HAVING AT LEAST TWO TRANSMISSION STAGES

(71) Applicant: Dana Belgium N.V., Bruges (BE)

(72) Inventors: Jan A. Bedert, Oostduinkerke (BE); Koen B. Seynaeve, Veldegem (BE); Dries C. T'Hooft, Damme (BE)

(73) Assignee: Dana Belgium N.V., Bruges (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,944

(22) Filed: Apr. 9, 2020

(65) Prior Publication Data

US 2020/0232546 A1 Jul. 23, 2020

Related U.S. Application Data

(62) Division of application No. 16/082,583, filed as application No. PCT/EP2017/055176 on Mar. 6, 2017, now Pat. No. 10,851,879.

(Continued)

(51) Int. Cl.
*F16H 61/688* (2006.01)
*F16H 37/04* (2006.01)
(Continued)

(52) U.S. Cl.
CPC ....... *F16H 37/043* (2013.01); *F16H 61/0403* (2013.01); *F16H 61/688* (2013.01);
(Continued)

(58) Field of Classification Search
CPC . Y10T 477/26; Y10T 477/33; Y10T 477/347; F16H 61/0403; F16H 61/688;
(Continued)

(56) References Cited

U.S. PATENT DOCUMENTS 5,655,990 A 8/1997 Ooyama et al.
5,834,657 A 11/1998 Clawson et al.
(Continued)

FOREIGN PATENT DOCUMENTS

EP 1422449 A2 5/2004
EP 2116407 A1 11/2009
(Continued)

OTHER PUBLICATIONS

ISA European Patent Office, International Search Report and Written Opinion Issued in Application No. PCT/EP2017/055176, dated Jun. 27, 2017, WIPO, 13 pages.
(Continued)

*Primary Examiner* — Roger L Pang
(74) *Attorney, Agent, or Firm* — McCoy Russell LLP (57) ABSTRACT

A method of shifting gears including providing a driveline for a vehicle. The driveline has an electric drive motor and a powershift transmission. The transmission has a first transmission stage and a second transmission stage. The method includes performing a range shift including handing over torque transmission from a range clutch of the first or second transmission to the other range clutch. The method also includes, simultaneously with the range shift, engaging one of the direction clutches of one transmission or keeping one of the direction clutches engaged.

17 Claims, 3 Drawing Sheets

Related U.S. Application Data (60) Provisional application No. 62/304,312, filed on Mar. 6, 2016.

(51) Int. Cl.
  *F16H 61/04* (2006.01)
  *B60W 10/111* (2012.01)
  *B60W 30/19* (2012.01)
  *B60W 10/08* (2006.01)

(52) U.S. Cl.
  CPC ............ *B60W 10/08* (2013.01); *B60W 10/111* (2013.01); *B60W 30/19* (2013.01); *B60W 2510/081* (2013.01); *B60W 2710/081* (2013.01); *B60W 2710/1005* (2013.01); *B60Y 2200/91* (2013.01); *F16H 2037/045* (2013.01); *F16H 2061/0422* (2013.01); *F16H 2200/0021* (2013.01); *Y10T 477/33* (2015.01); *Y10T 477/347* (2015.01)

(58) Field of Classification Search
  CPC ..... F16H 2200/0021; F16H 2061/0422; F16H 2037/045; F16H 3/126; B60Y 2200/0021; B60W 10/111; B60W 30/109; B60W 10/08; B60W 2510/081; B60W 2710/081; B60W 2710/1005
  See application file for complete search history.

(56) References Cited

U.S. PATENT DOCUMENTS

| | | |
|---|---|---|
| 5,884,201 A | 3/1999 | Kawai |
| 8,346,446 B2 | 1/2013 | Liu et al. |
| 8,942,876 B2 | 1/2015 | Dai et al. |
| 9,206,885 B2 * | 12/2015 | Rekow .................. F16H 47/04 |
| 10,851,879 B2 * | 12/2020 | Bedert .................. F16H 3/126 |
| 2003/0019313 A1 * | 1/2003 | Ibamoto .................. F16H 3/006 74/339 |
| 2008/0282823 A1 | 11/2008 | Kim et al. |
| 2009/0280944 A1 | 11/2009 | Hiraoka et al. |
| 2010/0234172 A1 | 9/2010 | Miyazaki et al. |
| 2010/0267518 A1 | 10/2010 | Versteyhe et al. |
| 2012/0028749 A1 | 2/2012 | Kawasaki et al. |
| 2013/0060411 A1 | 3/2013 | Kaltenbach |
| 2013/0296127 A1 | 11/2013 | Shelton et al. |

FOREIGN PATENT DOCUMENTS

| | | |
|---|---|---|
| WO | 2013072609 A1 | 5/2013 |
| WO | 2013184751 A1 | 12/2013 |
| WO | 2015068584 A1 | 5/2015 |

OTHER PUBLICATIONS

European Patent Office, Office Action Issued in Application No. 17708806.9, dated Feb. 4, 2020, Germany, 6 pages.

* cited by examiner

DRIVELINE FOR A VEHICLE INCLUDING AN ELECTRIC DRIVE MOTOR AND A POWERSHIFT TRANSMISSION HAVING AT LEAST TWO TRANSMISSION STAGES

CROSS-REFERENCE TO RELATED APPLICATIONS

The present application is a divisional of U.S. patent application Ser. No. 16/082,583, entitled "Driveline for a Vehicle Including an Electric Drive Motor and a Powershift Transmission Having At Least Two Transmission Stages", filed on Sep. 6, 2018. U.S. patent application Ser. No. 16/082,583 is a national phase of International Application No. PCT/EP2017/055176 filed Mar. 6, 2017, which claims priority to U.S. Provisional Patent Application No. 62/304,312, entitled "Shifting Algorithm for an Off-Highway Powershift Transmission Driven by an Electric Motor", filed on Mar. 6, 2016. The entire contents of each of the above-listed applications are hereby incorporated by reference for all purposes.

BACKGROUND OF THE INVENTION

The present document relates to a driveline for a vehicle including an electric drive motor and a powershift transmission having at least two transmission stages. Drivelines of the presently described type may find application in off-highway vehicles such as earth moving vehicles, material handling vehicles, mining vehicles or agricultural vehicles, for example.

Off-highway powershift transmissions are typically equipped with a torque converter to provide a connection with an internal combustion engine (ICE). The power delivered by the ICE is absorbed via the torque converter and inputted to the powershift transmission. The torque converter acts as a fluid coupling in the power path to provide a non-mechanical connection between the ICE and the powershift transmission. Only in the case of a lockup drive is the torque converter intentionally locked via a mechanical device to increase an overall efficiency of the torque converter. Other advantages of the torque converter are a damping of torsional vibrations produced by the ICE and an ability to change instantaneous speed ratio (SR) when load changes occur in the powertrain.

For example, US 2010/0267518 A1 describes a hybrid transmission for a vehicle comprising an ICE and a torque converter. The torque converter connects the ICE with a set of direction clutches and several range clutches. In order to increase energy efficiency and reduce fuel consumption, the transmission according to US 2010/0267518 A1 further comprises an electric machine. The electric machine is connected to an intermediate gear seat which is arranged in between the direction clutches and the range clutches.

However, there is demand for a driveline with further improved performance and drivability.

SUMMARY OF THE INVENTION

This object is solved by a driveline by a method of shifting gears.

The presently proposed driveline for a vehicle comprises at least:
an electric drive motor; and
a powershift transmission comprising at least:
 a first transmission stage having a first input drivingly engaged with the electric drive motor, a first output, a first clutching device, and a second clutching device, wherein the first input is configured to be drivingly engaged with the first output by engaging the first clutching device and by disengaging the second clutching device, and wherein the first input is configured to be drivingly engaged with the first output by engaging the second clutching device and by disengaging the first clutching device; and
 a second transmission stage having a second input drivingly engaged with the first output, a second output, a third clutching device, and a fourth clutching device, wherein the second input is configured to be drivingly engaged with the second output by engaging the third clutching device and by disengaging the fourth clutching device, and wherein the second input is configured to be drivingly engaged with the second output by engaging the fourth clutching device and by disengaging the third clutching device.

With respect to an internal combustion engine the output speed of the electric drive motor of the presently proposed driveline may be controlled faster and with greater accuracy, thereby improving the performance of the driveline, in particular during gear shifts. Furthermore, electric drive engines may be powered using renewable energy sources. Thus, compared to using an ICE as a power source, using an electric drive engine may reduce carbon dioxide emissions and operational costs.

The driveline may comprise a permanent mechanical connection connecting the electric drive motor with the first input, that is with the input of the powershift transmission. In particular, the electric drive motor may be permanently rigidly connected with the first input, for example by means of at least one of a torsional vibration damper and a prop shaft. Torsional vibration dampers are generally known in the art of automotive transmissions. Preferably, the driveline does not include a torque converter, thereby reducing production costs and maintenance costs.

Typically, the second output, that is the output of the powershift transmission, is drivingly engaged or selectively drivingly engaged with a vehicle output. The vehicle output may comprise at least one of a drive shaft, a differential, a drive axle, a reduction gear and a ground engaging structure such as one or more wheels, for example.

The first clutching device and the second clutching device may be configured as direction clutches and the third clutching device and the fourth clutching device may be configured as range clutches. Alternatively, the first clutching device and the second clutching device may be configured as range clutches and the third clutching device and the fourth clutching device may be configured as direction clutches. For example, the direction clutches may include a forward direction clutch and a reverse direction clutch, and the range clutches may include a low range clutch associated with a low range gear and a high range clutch associated with a high range gear. For example, given an input speed and an input torque at the first input, the low range gear may be configured to provide, at the second output, a first speed and a first torque. And given the same input speed and the same input torque at the first input, the high range gear may be configured to provide, at the second output, a second speed and a second torque, wherein the second speed provided by the high range gear is higher than the first speed provided by the low range gear and wherein the second torque provided by the high range gear is lower than the first torque provided by the low range gear.

The direction clutches and/or the range clutches may include or may be configured as hydraulic clutches, electromagnetic clutches or any other type of clutches known in the art of automotive transmissions.

The driveline may further comprise a shift controller for shifting the powershift transmission. The shift controller typically comprises electric circuitry including one or more programmable processing units such as one or more microprocessors, one or more field programmable gate arrays (FPGAs), or the like. For example, the shift controller may comprise a transmission control unit (TCU) for controlling the powershift transmission, in particular for controlling the engagement and the disengagement (i. e. the opening and the closing) of the clutching devices of the powershift transmission.

The shift controller may further comprise a motor control unit (MCU) for controlling the electric drive motor, in particular for controlling a speed of the electric drive motor. For example, the electric drive motor may be configured as a variable frequency controlled AC motor. The MCU may then comprise an AC motor drive. A requested vehicle speed may obtained by controlling the speed of the AC motor using frequency control. The vehicle speed may be set in response to movement of a throttle control by an operator. Additionally or alternatively, the vehicle speed may be set based on or in response to the shift controller shifting the powershift transmission into an appropriate range gear.

The driveline may further comprise an electric power source configured to provide electric power to the electric drive motor. For example, the electric power source may comprise at least one of a battery pack, one or more electric accumulators, one or more super capacitors, a diesel generator and a power cable.

The shift controller may be configured to perform a range shift including handing over torque transmission from one of the range clutches to the other of the range clutches, and to, simultaneously, engage one of the direction clutches or keep one of the direction clutches engaged. Handing over torque transmission from one of the range clutches, the off-going or opening range clutch, to the other of the range clutches, the on-coming or closing range clutch, includes shifting the powershift transmission from a state in which the off-going range clutch is engaged and the on-coming range clutch is disengaged to a state in which the off-going range clutch is disengaged and the on-coming range clutch is engaged.

If the first transmission stage comprises the direction clutches and the second transmission stage comprises the range clutches, the step of engaging one of the direction clutches or of keeping one of the direction clutches engaged during the range shift includes rotationally locking the electric drive motor to the first output or keeping the electric drive motor rotationally locked to the first output during the range shift. In this manner, the electric drive motor may be used to control the speed of the closed direction clutch in the first transmission stage and of the first output before the range shift in the second transmission stage is completed, that is before the on-coming or closing range clutch is fully engaged, thereby providing a particularly smooth shift.

On the other hand, if the first transmission stage comprises the range clutches and the second transmission stage comprises the direction clutches, the step of engaging one of the direction clutches or of keeping one of the direction clutches engaged during the range shift includes rotationally locking the first output to the vehicle output or keeping the first output rotationally locked to vehicle output during the range shift. In this manner, the closed direction clutch in the second transmission stage and the first output are dragged along by the vehicle output, and the electric drive motor may be used to control the speed of the first input before the range shift in the first transmission stage is completed.

For example, the shift controller may be configured to synchronize a speed of the electric drive motor with a target speed during the range shift. The shift controller may be configured to synchronize the speed of the electric drive motor with the target speed by applying known control methods such open loop control or closed loop control.

The target speed may be the speed at which, given a current vehicle speed or a current speed of the second output, the electric drive motor is intended to run when or once the range shift has been completed, that is when or once the on-coming range clutch has been fully closed or engaged. That is, the target speed may depend on at least one of a current vehicle speed, a current speed of the second output, and a drive ratio or gear ratio of the selected gear, that is the drive ratio or gear ratio associated with the on-coming range clutch. Thus, the shift controller may be configured to determine the target speed based on the known drive ratio or gear ratio of the selected gear, and based on at least one of a speed of the second output and a vehicle speed. For example, the shift controller may be in communication with one or more speed sensors for measuring the current vehicle speed or the current rotational speed of the second output.

In particular, the shift controller may be configured to continuously monitor the speed of the second output or the vehicle speed, and to continuously adapt the target speed and the synchronization during the range shift based on a current speed of the second output or based on a current vehicle speed. In this way, the shift controller may be configured to adapt the target speed and the process of synchronizing the speed of the electric drive motor to the target speed in response to an acceleration or deceleration of the vehicle during the shift. For example, an acceleration or deceleration of the vehicle during the shift may be caused by the operator changing a throttle pedal position, by friction between the road and the vehicle wheels, or by a change in the inclination of the road.

In order to guarantee a smooth shift, the shift controller may be configured to compare or to continuously compare the speed of the electric drive motor with the target speed and to initiate engagement of the range clutch to which torque transmission is handed only when or only once a deviation of the speed of the electric drive motor from the target speed is smaller than a predetermined threshold.

The shift controller may be configured to initiate the range shift automatically when or once a speed of the electric drive motor reaches or exceeds an upper set point or when or once the speed of the electric drive motor reaches or falls below a lower set point. For example, the shift controller may be configured to initiate an upshift to a higher range gear when or once the speed of the electric drive motor reaches or exceeds the upper speed set point, and the shift controller may be configured to initiate a downshift to a lower range gear when or once the speed of the electric drive motor reaches or falls below the lower speed set point. Based on the construction or specification of the electric drive motor the upper speed set point may be between 2000 rpm and 2500 rpm, and the lower speed set point may be between 800 rpm and 1200 rpm, for example. However, it is understood that the upper speed set point and the lower speed set point may assume other values. Additionally or alternatively, the shift controller may be configured to initiate the shift based on a shift request provided by an operator of the vehicle.

The shift controller may also be configured to increase the speed of the electric drive motor when or once the shift to the selected gear has been completed, that is when or once the range clutch to which torque transmission is handed has been fully engaged.

The presently proposed method of shifting gears comprises the steps of:
providing a driveline;
performing a range shift by handing over torque transmission from one of the range clutches to the other of the range clutches; and, simultaneously,
engaging one of the direction clutches or keeping one of the direction clutches engaged.

The method may further comprise one or more or all of the following steps:
synchronizing, during the range shift, a speed of the electric drive motor with a target speed;
determining the target speed based on a gear ratio associated with the range clutch to which torque transmission is handed during the range shift, and based on one of a speed of the second output and a vehicle speed;
continuously monitoring the speed of the second output or the vehicle speed, and continuously adapting the target speed and the synchronization during the range shift based on a current speed of the second output or based on a current vehicle speed;
comparing the speed of the electric drive motor with the target speed and initiating engagement of the range clutch to which torque transmission is handed only when or only once a deviation of the speed of the electric drive motor from the target speed is smaller than a predetermined threshold;
initiating the range shift when or once a speed of the electric drive motor reaches or exceeds an upper set point or when or once the speed of the electric drive motor reaches or falls below a lower set point; and
increasing the speed of the electric drive motor when or once the range clutch to which torque transmission is handed during the range shift has been engaged.

BRIEF DESCRIPTION OF THE DRAWINGS

The above, as well as other advantages of the presently proposed driveline and gear shifting method, will become readily apparent to those skilled in the art from the following detailed description when considered in the light of the accompanying drawing showing an embodiment of the presently proposed driveline and shifting method. In the drawing.

DETAILED DESCRIPTION OF THE INVENTION

Figure 1:
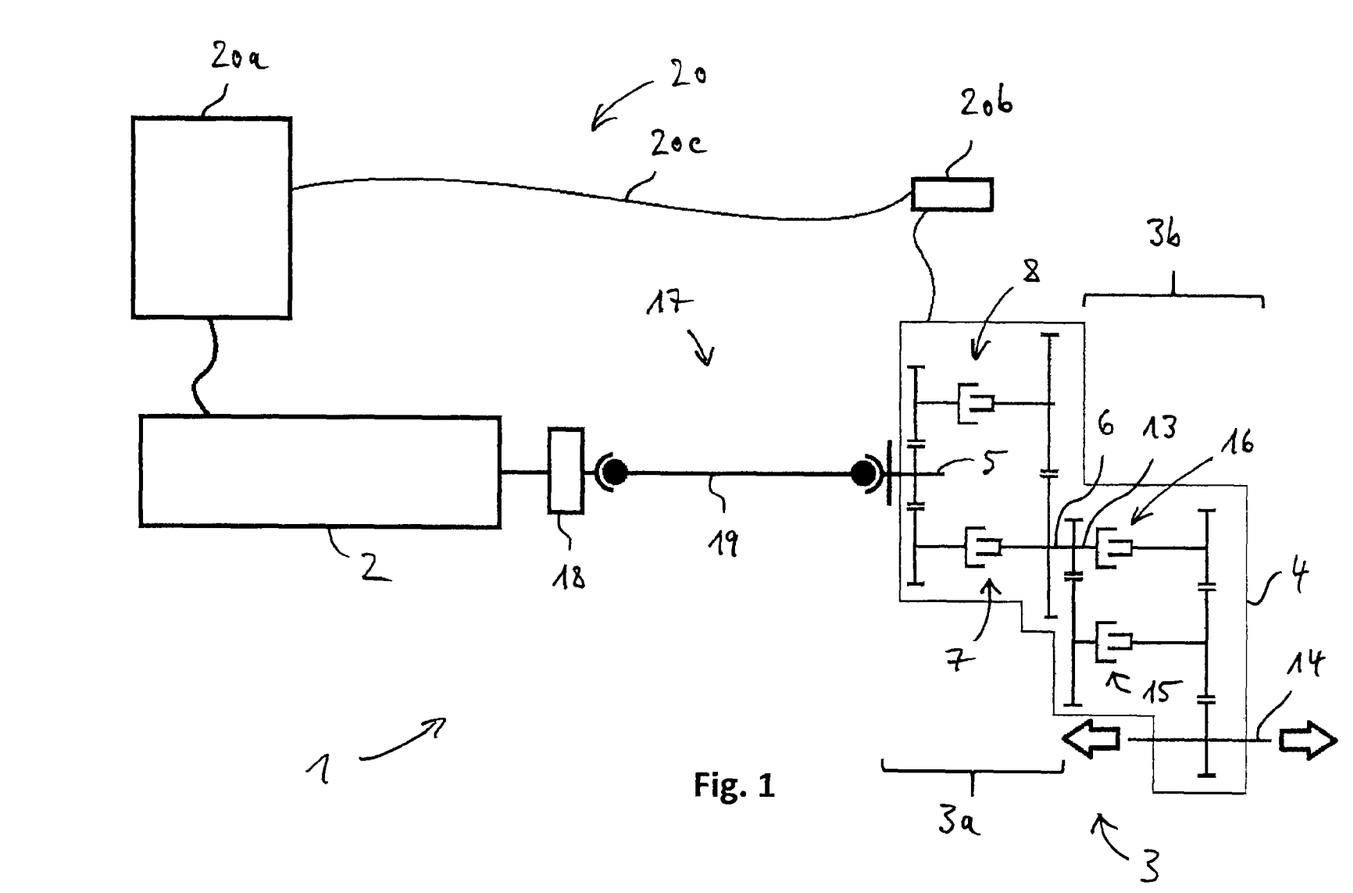
FIG. 1 shows a schematic of a driveline in accordance with the invention, the driveline comprising an electric drive motor and a two-stage powershift transmission.

FIG. 1 schematically illustrates a driveline 1 arranged in an off-highway vehicle such as a wheel loader or a tractor (not shown). The driveline 1 comprises an electric drive motor 2, a powershift transmission 3 disposed in a transmission casing 4, and a shift controller 20. The electric drive motor 2 comprises a variable frequency controlled AC motor. The shift controller 20 includes a motor control unit (MCU) 20a in communication with the electric drive motor 2 for controlling a speed of the electric drive motor 2, and a transmission control unit (TCU) 20b in communication with the powershift transmission 3 for controlling the powershift transmission 3. The shift controller 20 further includes a CAN bus 20c providing communication between the MCU 20a and the TCU 20b. The powershift transmission 3 includes a first transmission stage 3a and a second transmission stage 3b.

The first transmission stage 3a has a first input shaft 5, a first output shaft 6, a first clutching device 7 and a second clutching device 8. The first input shaft 5 may be drivingly engaged with the first output shaft 6 by engaging the first clutching device 7 and by disengaging the second clutching device 8, and the first input shaft 5 may be drivingly engaged with the first output shaft 6 by disengaging the first clutching device 7 and by engaging the second clutching device 8.

In the embodiment depicted in FIG. 1 the clutching devices 7, 8 of the first transmission stage 3a are configured as direction clutches. The input shaft 5, the output shaft 6, the first clutching device 7 and the second clutching device 8 are configured such that when the first clutching device 7 is engaged and the second clutching device 8 is disengaged the first output shaft 6 turns in a first direction relative to the direction of rotation of the first input shaft 5, and that when the second clutching device 8 is engaged and the first clutching device 7 is disengaged the first output shaft 6 turns in a second direction relative to the direction of rotation of the first input shaft 5, wherein the first direction is opposite the second direction. For example, when the first clutching device 7 is closed and the second clutching device 8 is open, the vehicle may be configured to move in the forward direction, and when the second clutching device 8 is closed and the first clutching device 7 is open, the vehicle may be configured to move in the reverse direction. Here, the first clutching device 7 and the second clutching device 8 provide the same gear ratio between the first output shaft 6 and the first input shaft 5. However, it is understood that in alternative embodiments not explicitly depicted here the gear ratio associated with the first clutching device 7 may be different from the gear ratio associated with the second clutching device 8.

In the embodiment depicted in FIG. 1 the direction clutches 7, 8 may be configured as hydraulic clutches that may be engaged and disengaged by raising and lowering a hydraulic pressure in a clutch chamber. For example, the shift controller 20 is configured to control the hydraulic pressure in the clutch chambers of the direction clutches 7, 8 by controlling one or more control valves. However, it is understood that in alternative embodiments of the powershift transmission 3 the direction clutches 7, 8 may be configured as any other type of clutch known in the art.

The first input shaft 5 is drivingly engaged with the electric drive engine 2, the first input shaft 5 thereby functioning as the input of the powershift transmission 3. Here, the first input shaft 5 is drivingly engaged with the electric drive engine 2 by means of a permanent mechanical or rigid connection 17 comprising a torsional vibration damper 18 and a prop shaft 19. The connection 17 between the electric drive engine 2 and the powershift transmission 3 does not include a torque converter, thereby rendering the driveline 1 particularly cost-saving.

The second transmission stage 3b has a second input shaft 13, a second output shaft 14, a third clutching device 15 and a fourth clutching device 16. Generally, the second input shaft 13 is drivingly engaged with the first output shaft 6. In the embodiment depicted in FIG. 1, the second input shaft 13 and the first output shaft 6 are integrally formed. The second input shaft 13 may be drivingly engaged with the second output shaft 14 by engaging the third clutching device 15 and by disengaging the fourth clutching device 16, and the second input shaft 13 may be drivingly engaged with the second output shaft 14 by disengaging the third clutching device 15 and by engaging the fourth clutching device 16.

In the embodiment depicted in FIG. 1, the clutching devices 15, 16 of the second transmission stage 3b are configured as range clutches which provide different gear ratios between the second output shaft 14 and the second input shaft 13. The second input shaft 13, the second output shaft 14, the third clutching device 15 and the fourth clutching device 16 are configured such that when the third clutching device 15 is engaged and the fourth clutching device 16 is disengaged the second transmission stage 3b is in a low range gear providing low speed and high torque at the second output shaft 14, and that when the fourth clutching device 16 is engaged and the third clutching device 15 is disengaged the second transmission stage 3b is in a high range gear providing high speed and low torque at the second output shaft 14. Further, the second input shaft 13, the second output shaft 14, the third clutching device 15 and the fourth clutching device 16 are configured such that the second output shaft 14 turns in the same direction relative to the direction of rotation of the second input shaft 13 irrespective of the gear the second transmission portion 3b is in, that is irrespective of whether the third clutching device 15 is engaged and the fourth clutching device 16 is disengaged or vice versa.

In the embodiment depicted in FIG. 1, the range clutches 15, 16 may be configured as hydraulic clutches that may be engaged and disengaged by raising and lowering a hydraulic pressure in a clutch chamber. For example, the shift controller 20 may be configured to control the hydraulic pressure in the clutch chambers of the range clutches 15, 16 by controlling one or more control valves. However, it is understood that in alternative embodiments of the powershift transmission 3 the range clutches 15, 16 may be configured as any other type of clutch known in the art.

The second output shaft 14 functions as an output of the powershift transmission 3 and may be drivingly engaged or selectively drivingly engaged with a vehicle output. The vehicle output may comprise at least one of a drive shaft, a differential, a drive axle, a reduction gear and a ground engaging structure such as one or more wheels, for example.

It is understood that the embodiment of the powershift transmission 3 depicted in FIG. 1 is merely exemplary and that alternative embodiments of the powershift transmission 3 not explicitly depicted here may include more than two transmission stages and more than two range gears. Also, it is understood that in alternative embodiments of the powershift transmission 3 the first transmission stage 3a may include the range clutches and the second transmission stage 3b may include the direction clutches.

The fact that the powershift transmission 3 includes two transmission stages wherein one of the two transmission stages comprises direction clutches as described above has the advantage that the powershift transmission 3 may be combined with drive engines that provide only a single direction of rotation and still provide both a forward and a reverse drive mode. For example, the electric drive engine 2 may be configured to provide only a single direction of rotation, or the driveline 1 may be upgraded to additionally include an internal combustion engine that could likewise be connected with the first input shaft 5 of the powershift transmission 3.

Figure 2:
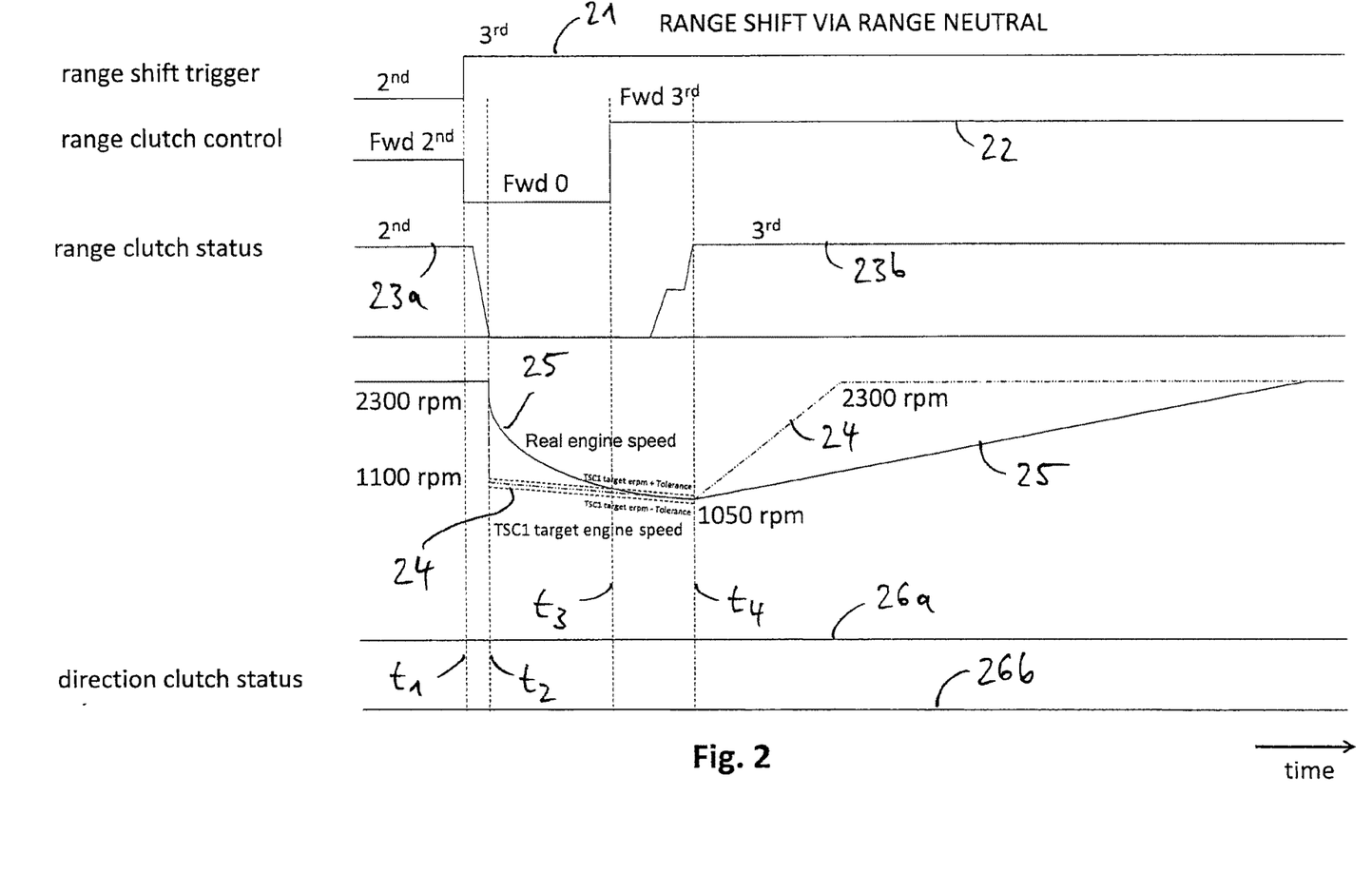
FIG. 2 shows a time course of shift control parameters during a range shift of the driveline of FIG. 1.

FIG. 2 shows a time course of shift control parameters during a range shift of the driveline 1 depicted in FIG. 1. Before movement of the vehicle including the driveline 1, an initialization procedure is performed. The initialization includes the following steps (not shown). First, the electric drive motor 2 is at standstill condition (zero speed). Next, a range gear is selected. When the range clutches are configured as hydraulic clutches selecting a range gear typically includes pressurizing the range clutch associated with the selected range gear (typically this is a first range gear). Lastly, a driving direction is selected. Again, when the direction clutches are configured as hydraulic clutches selecting a driving direction typically includes pressurizing the direction clutch associated with the selected driving direction. It should be noted that in invention driveline including an electric drive motor 2 capable of operating in both directions, a driving direction stage of the transmission may not be needed.

FIG. 2 specifically refers to a range shift shifting the powershift transmission 3 from a second forward gear to a third forward gear. However, although the embodiment depicted in FIG. 2 relates to an upshift it is understood that in alternative embodiments not explicitly depicted here the same or similar steps may be performed during a downshift in an analogous manner. The shift control parameters whose time course is depicted in FIG. 2 include from top to bottom: a range shift trigger signal 21, a range clutch control signal 22, clutch status signals 23a, 23b, a target motor speed 24, an actual motor speed 25, and direction clutch status signals 26a, 26b.

The range shift trigger signal 21 indicates the selected range gear, wherein a jump in the range shift trigger signal 21 indicates that a range shift is initiated. The range clutch control signal 22 includes electric signals used to control the state of the range clutches 15, 16. For example, the range clutch control signal 22 may include electric signals sent from the shift controller 20 to the control valves that control the pressure in the clutch chambers of the range clutches 15, 16.

The clutch status signals 23a, 23b may include measured sensor signals sent from one or more sensors to the shift controller 20 and indicating the actual status of the range clutches 15, 16. For example, the clutch status signal 23a may represent a measured pressure signal indicating a hydraulic pressure in the clutch chamber of the range clutch 15 associated with the second range gear, and the clutch status signal 23b may represent a measured pressure signal indicating a hydraulic pressure in the clutch chamber of the range clutch 16 associated with the third range gear.

Similarly, the direction clutch status signals 26a, 26b may include measured sensor signals sent from one or more sensors to the shift controller 20 and indicating the actual status of the direction clutches 7, 8. For example, the clutch status signal 26a may represent a measured pressure signal indicating a hydraulic pressure in the clutch chamber of the forward direction clutch 7, and the clutch status signal 26b may represent a measured pressure signal indicating a hydraulic pressure in the clutch chamber of the reverse direction clutch 8.

The target motor speed 24 is the desired speed of the electric drive motor 2 determined by the shift controller 20. And the actual motor speed 25 represents the current speed at which the electric drive motor 2 is rotating.

Prior to time $t_1$, that is before the range shift is initiated, the powershift transmission 3 is in the second forward gear as indicated by the values of the range shift trigger signal 21, the range clutch control signal 22, the range clutch status signals 23a, 23b, and the direction clutch status signals 26a, 26b. In the second forward gear the forward direction clutch 7 is engaged, the reverse direction clutch 8 is disengaged, the range clutch 15 associated with the (lower) second range gear is engaged, and the range clutch 16 associated with the (higher) third range gear is disengaged. The electric drive motor 2 is turning at a speed of approximately 2300 rpm, and as the electric drive motor 2 is drivingly engaged with the vehicle output the vehicle is moving in the forward direction at non-zero speed.

At time $t_1$ a jump in the range shift trigger signal 21 indicates that a range shift from the lower second forward gear to the higher third forward gear is initiated. For example, the range shift from the lower second forward gear to the higher third forward gear may be initiated automatically once the speed of the electric drive motor 2 reaches or exceeds an upper set point. Alternatively, the range shift may be initiated based on a shift request provided by an operator of the vehicle.

As soon as the range shift is initiated at time $t_1$, the shift controller 20 changes the control signal 22 to command the currently engaged range clutch 15 associated with the second range gear to disengage. Specifically, the shift controller 20 commands the control valve of the off-going range clutch 15 to lower the hydraulic pressure in the clutch chamber of the off-going range clutch 15, resulting in a subsequent pressure drop in the clutch chamber of the off-going range clutch 15, as indicated by the decrease in the range clutch status signal 23a shortly after time $t_1$. Further at time $t_1$, the shift controller 20 commands the on-coming range clutch 16 to remain disengaged and commands the electric drive engine 2 to continue to rotate at its current speed of approximately 2300 rpm. As indicated by the clutch status signals 26a, 26b, the shift controller 20 commands the forward direction clutch 7 to remain engaged and commands the reverse direction clutch 8 to remain disengaged throughout the range shift.

At time $t_2$ a drop of the pressure signal 23a of the off-going range clutch 15 below a predetermined threshold indicates that the off-going range clutch 15 has disengaged, thereby decoupling the electric drive motor 2 from the vehicle output. That is, starting at time $t_2$ both the off-going range clutch 15 and the on-coming range clutch 16 are disengaged. However, as the shift controller 20 commands the forward direction clutch 7 to remain engaged throughout the range shift, the electric drive motor remains rotationally locked to the first output shaft 6 of the first transmission stage 3a.

Once the off-going range clutch 15 has disengaged at time $t_2$, the shift controller 20 lowers the value of the target speed 24 to a value that differs from the current vehicle speed 25. (By contrast, during a downshift the shift controller 20 would typically raise the value of the target speed 24 to a value above the current vehicle speed once the off-going range clutch has disengaged.) The shift controller 20 determines the value of the target speed 24 based on the current vehicle speed, the gear ratio of the selected third range gear associated with the on-coming range clutch 16, and the gear ratio between the first input shaft 5 and the first output shaft 6. For example, the target speed 24 may correspond to the speed at which, given the current vehicle speed, the electric drive motor 2 needs to rotate so that the on-coming range clutch 16 may be engaged with minimal slip and without causing mechanical jerks.

At time $t_2$ the shift controller 20 sets the target speed 24 to a value of approximately 1100 rpm. Further at time $t_2$, the shift controller 20 starts a control algorithm aimed at synchronizing the speed 25 of the electric drive motor 2 with the target speed 24. As a result, the shift controller 20 commands the electric drive motor 2 to lower its speed 25 at time $t_2$, resulting in a decrease of the motor speed 25 at time $t_2$. For example, the shift controller 20 may include a PID controller to synchronize the speed 25 of the electric drive motor 2 with the target speed 24. However, it is understood that the shift controller 20 may be configured to run any other control algorithm known in the art.

In order to account for an acceleration or deceleration of the vehicle during the range shift, the shift controller 20 may be configured to continuously monitor the speed of the second output shaft 14 or the vehicle speed, and to continuously adapt the target speed 24 and the process of synchronizing the speed 25 of the electric drive motor 2 with the target speed 24 during the range shift based on the current vehicle speed. For example, in FIG. 2 it can be observed that, starting at time $t_2$, the target speed 24 which is continuously updated by the shift controller 20 slowly decreases in an approximately linear fashion. This decrease of the target speed 24 may be due to a deceleration of the vehicle caused, for example, by friction between the road and the vehicle wheels. Further, it can be observed that the shift controller 20 controls the motor speed 25 such that it asymptotically approaches the decreasing target speed 24.

The shift controller 20 continuously compares the current motor speed 25 with the continuously updated target speed 24. At time $t_3$ the shift controller 20 determines that a deviation of the current motor speed 25 from the target speed 24 has reached or falls below a predetermined threshold, and the shift controller 20 commands the on-coming range clutch 16 associated with the selected third forward gear to engage, as indicated by the change in the value of the range clutch control signal 22 at time $t_3$. Specifically, at time $t_3$ the shift controller 20 commands the control valve of the on-coming range clutch 16 to raise the hydraulic pressure in the clutch chamber of the on-coming range clutch 16, resulting in a subsequent pressure increase in the clutch chamber of the on-coming range clutch 16, as indicated by the steady increase in the range clutch status signal 23b shortly after time $t_3$.

The shift controller 20 may further be configured to initiate engagement of the on-coming range clutch 16 only when or once a predetermined amount of time has elapsed since the range shift was initiated at time $t_1$. This predetermined amount of time may be tunable, for example. Further at time $t_3$, the shift controller 20 continues to update the target speed 24 and to synchronize the speed 25 of the electric drive motor 2 with the target speed, resulting in an ever smaller deviation of the motor speed 25 from the target speed 24 as the on-coming range clutch 16 starts engaging. As a consequence, the on-coming range clutch 16 is engaged with minimum slip and without causing unwanted mechanical jerks.

At time $t_4$ the on-coming range clutch 16 is fully engaged, as indicated by the fact that at time $t_4$ the hydraulic pressure in the clutch chamber of the on-coming range clutch 16 has reached its maximum value. FIG. 2 further shows that at time $t_4$ when the on-coming range clutch 16 is fully engaged, the speed 25 of the electric drive motor 2 is fully synchronized with the target speed 24 at a value of approximately 1050 rpm. Once the on-coming range clutch 16 is fully engaged at time $t_4$, the shift controller 20 raises the target speed 24, resulting in an increase of the motor speed 25.

Figure 3:
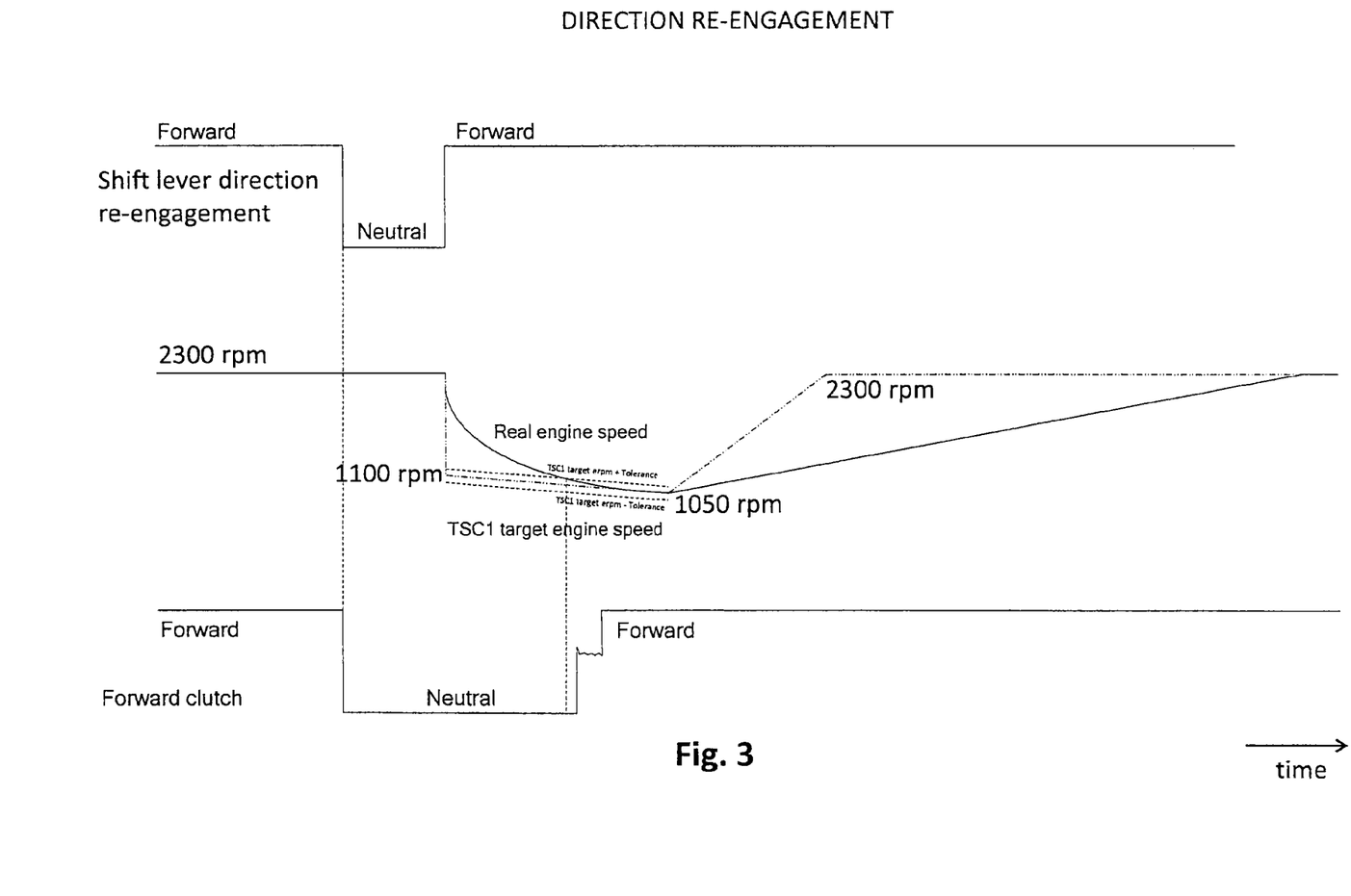
FIG. 3 shows a time course of shift control parameters during a direction shift of the driveline of FIG. 1.

It is understood that a direction clutch re-engagement procedure may be carried out in a similar fashion as the range shift described with reference to FIG. 2. FIG. 3 shows a time course of shift control parameters during the process of disengaging and re-engaging the forward direction clutch 7 of the powershift transmission 3 depicted in FIG. 1. For example, when the operator places the both direction clutches 7, 8 of the powershift transmission 3 into a neutral state of operation, whether intentionally or unintentionally, it is possible to reengage the direction of movement clutch while the vehicle is still moving. This could occur for example, because of the operator changing their mind or a particular operational situation. The direction clutch re-engagement procedure is a variation of the range shifting procedure described hereinabove. FIG. 3 diagrammatically represent all of the events that need to happen to complete the direction re-engagement procedure.

The invention claimed is:

1. A method of shifting gears, the method comprising the steps of:
providing a driveline for a vehicle, the driveline comprising:
an electric drive motor; and
a powershift transmission comprising at least:
a first transmission stage having a first input drivingly engaged with the electric drive motor, a first output, a first clutching device, and a second clutching device, wherein the first input is configured to be drivingly engaged with the first output by engaging the first clutching device and by disengaging the second clutching device, and wherein the first input is configured to be drivingly engaged with the first output by engaging the second clutching device and by disengaging the first clutching device; and
a second transmission stage having a second input drivingly engaged with the first output, a second output, a third clutching device, and a fourth clutching device, wherein the second input is configured to be drivingly engaged with the second output by engaging the third clutching device and by disengaging the fourth clutching device, and wherein the second input is configured to be drivingly engaged with the second output by engaging the fourth clutching device and by disengaging the third clutching device;
wherein one of
a. the first clutching device and the second clutching device are configured as direction clutches and the third clutching device and the fourth clutching device are configured as range clutches; and
b. the first clutching device and the second clutching device are configured as range clutches and the third clutching device and the fourth clutching device are configured as direction clutches;
the method further comprising the steps of:
performing a range shift including handing over torque transmission from one of the range clutches to the other of the range clutches; and, simultaneously,
engaging one of the direction clutches or keeping one of the direction clutches engaged,
wherein the range shift is initiated when or once a speed of the electric drive motor reaches or exceeds an upper set point or when or once the speed of the electric drive motor reaches or falls below a lower set point.

2. The method according to claim 1, further comprising: synchronizing, during the range shift, a speed of the electric drive motor with a target speed.

3. The method according to claim 2, wherein the target speed is determined based on a gear ratio associated with the range clutch to which torque transmission is handed during the range shift, and based on at least one of a speed of the second output and a vehicle speed.

4. The method according to claim 3, further comprising:
continuously monitoring the speed of the second output or the vehicle speed, and continuously adapting the target speed and a process of synchronizing the speed of the electric drive motor with the target speed during the range shift based on at least one of a current speed of the second output and a current vehicle speed.

5. The method according to claim 2, further comprising:
comparing the speed of the electric drive motor with the target speed and initiating engagement of the range clutch to which torque transmission is handed only when or only once a deviation of the speed of the electric drive motor from the target speed is smaller than a predetermined threshold.

6. The method according to claim 2, further comprising:
increasing the speed of the electric drive motor when or once the range clutch to which torque transmission is handed during the range shift has been engaged.

7. The method of claim 1, wherein the electric drive motor is configured as a variable frequency controlled AC motor.

8. The method of claim 1, further comprising the step of transmitting torque from the electric drive motor to the first input by means of at least one of a torsional vibration damper and a prop shaft.

9. A method of shifting gears, the method comprising:
in a driveline including an electric drive motor,
transitioning torque transmission from a first range clutch to a second range clutch of a two-stage powershift transmission while simultaneously engaging a direction clutch,
wherein the transition of torque transmission is initiated when or once a speed of the electric drive motor reaches or exceeds an upper set point or when or once the speed of the electric drive motor reaches or falls below a lower set point.

10. The method of claim 9, wherein simultaneously engaging the direction clutch includes maintaining the direction clutch in an engaged state throughout transitioning the torque transmission.

11. The method of claim 9, wherein the first range clutch is a low range clutch associated with a low range gear, and wherein the second range clutch is a high range clutch associated with a high range gear that is higher than the low range gear.

12. The method of claim 9, wherein the first range clutch is a high range clutch associated with a high range gear, and wherein the second range clutch is a low range clutch associated with a low range gear that is lower than the high range gear.

13. The method of claim 9, wherein the direction clutch is a forward direction clutch.

14. The method of claim 13, wherein a reverse direction clutch is maintained in a disengaged state throughout the transitioning of torque transmission.

15. The method of claim 9, wherein the transition of torque transmission is initiated automatically once the speed of the electric drive motor reaches or exceeds the upper set point.

16. A method of shifting gears, the method comprising:
in a driveline including an electric drive motor and a two-stage powershift transmission, the two-stage powershift transmission including a first range clutch, a second range clutch, and a direction clutch, performing a range shift, wherein the range shift includes handing over torque transmission from the first range clutch to the second range clutch; and, simultaneously, engaging the direction clutch or keeping the direction clutch engaged, wherein the range shift is initiated when or once a speed of the electric drive motor reaches or exceeds an upper set point or when or once the speed of the electric drive motor reaches or falls below a lower set point.

17. The method of claim 16, wherein the range shift is automatically initiated to a higher range gear once the speed of the electric drive motor reaches or exceeds an upper set point.

* * * * *